United States Patent [19]

Yanai

[11] 4,444,070
[45] Apr. 24, 1984

[54] VARIABLE RATIO RACK AND PINION STEERING GEAR

[75] Inventor: Tokiyoshi Yanai, Yokosuka, Japan

[73] Assignee: Nissan Motor Co., Ltd., Yokohama, Japan

[21] Appl. No.: 297,932

[22] Filed: Aug. 31, 1981

[30] Foreign Application Priority Data

Sep. 1, 1980 [JP] Japan .................. 55-119825

[51] Int. Cl.³ .................. F16H 1/04; B62D 1/20; G05G 1/03
[52] U.S. Cl. .................. 74/422; 74/498; 74/508
[58] Field of Search .................. 74/422, 498, 508

[56] References Cited

U.S. PATENT DOCUMENTS

| | | | |
|---|---|---|---|
| Re. 28,740 | 3/1976 | Bishop | 74/422 |
| 2,865,339 | 12/1958 | Bishop | 91/434 |
| 3,064,491 | 11/1962 | Bishop | 74/498 |
| 3,267,763 | 8/1968 | Merritt | 74/422 |
| 4,133,221 | 1/1979 | Clary | 74/498 |

FOREIGN PATENT DOCUMENTS

| | | | |
|---|---|---|---|
| 52-29049 | 7/1977 | Japan . | |
| 55-51665 | 4/1980 | Japan | 74/508 |
| 1439337 | 6/1976 | United Kingdom | 74/498 |

Primary Examiner—Lawrence J. Staab
Assistant Examiner—Michael David Bednarek
Attorney, Agent, or Firm—Schwartz, Jeffery, Schwaab, Mack, Blumenthal & Koch

[57] ABSTRACT

In accordance with the present invention, there is provided a novel and improved variable ratio rack and pinion steering gear wherein the pinion has teeth of variable shape and size and the rack has teeth at least in part of variable shape and size. The teeth of the pinion are correctly meshable with a uniformly toothed rack profile and adapted to provide variable pitch circles. The teeth of the rack are adapted to be generated by using the profile of the pinion teeth in a manner to provide a desired variable ratio between the pinion and the rack.

6 Claims, 10 Drawing Figures

VARIABLE RATIO RACK AND PINION STEERING GEAR

BACKGROUND OF THE INVENTION

1. Field of the Invention

The present invention relates to a variable ratio rack and pinion steering gear for road vehicles.

2. Description of the Prior Art

A typical form of variable ratio rack and pinion steering gear is disclosed in the Japanese Patent Publication No. 52-29049 and wherein the pinion is formed as a standard helical pinion having identical involute teeth whilst the rack is formed as a variably contoured rack having teeth of variable shape and pitch. The rack teeth are adapted to be generated by using a cutter having blades of the same tooth form as that of the pinion, i.e., the rack teeth are adapted to be generated by using the profile of the pinion teeth.

The rack and pinion steering gear of the above-described type encounters a difficulty of obtaining adequate strength in the rack, particularly when a relatively wide variation of gear ratio is required. This is due to the fact that the rack teeth have, at the region for providing a relatively small gear ratio, a tendency to have a large pressure angle and therefore to be sharp-edged at the tops and also have, at the region for a relatively small gear ratio, a tendency to have undercuts at the roots. In the case where this tendency is pronounced, a considerably wide variation in strength of the rack teeth and therefore a considerable reduction in steering force transfer efficiency will inevitably result.

SUMMARY OF THE INVENTION

In accordance with the present invention, there is provided a novel and improved variable ratio rack and pinion steering gear. The pinion is of a circular form and has a concentric addendum circle. The teeth of the pinion are correctly meshable with a uniformly toothed rack profile and adapted to provide a variable pitch circle radius that is at a maximum at a predetermined position of the pinion, gradually reduces with the rotary movement of the pinion in either direction out of the predetermined position, and is at a minimum at 180° of rotary movement of the pinion out of the predetermined position. The rack in mesh with the pinion is generated by using the profile of the pinion teeth in a manner to provide a desired variable ratio between the pinion and the rack.

With the rack and pinion constructed as above in accordance with the present invention, a wider variation of gear ratio can be attained without sacrificing the strength or rigidity of the steering gear, particularly of the rack teeth.

It is an object of the present invention to provide a novel and improved variable ratio rack and pinion steering gear which is free from the foregoing drawbacks inherent in prior art rack and pinion steering gears of the described type.

It is a further object of the present invention to provide a novel and improved variable ratio rack and pinion steering gear of the above-mentioned character which is enabled to have a wider variation of gear ratio without sacrificing the strength or rigidity of the steering gear, particularly the rack teeth.

BRIEF DESCRIPTION OF THE DRAWINGS

The features and advantages of the variable ratio rack and pinion steering gear according to the present invention will become more clearly appreciated from the following description taken in conjunction with the accompanying drawings, in which.

DESCRIPTION OF THE PREFERRED EMBODIMENTS

Figure 1:
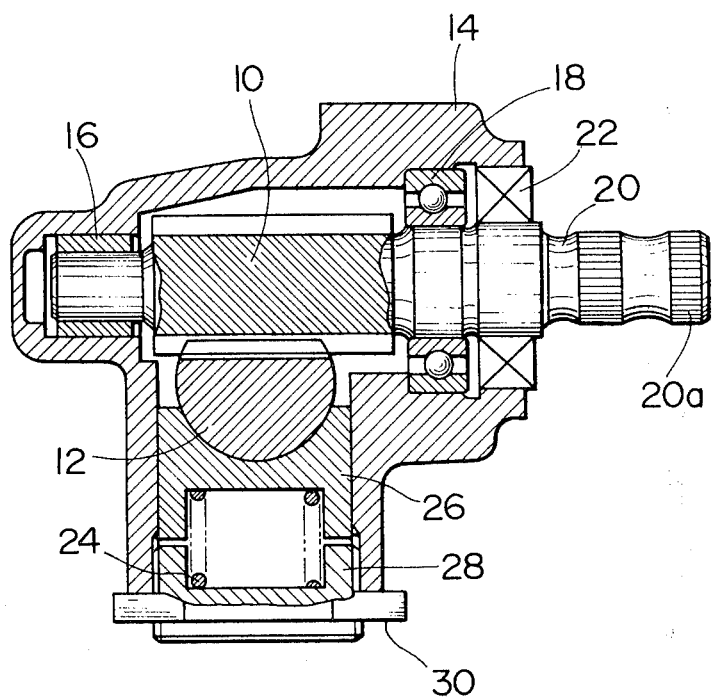
FIG. 1 shows a variable ratio rack and pinion steering gear embodying the present invention.

Referring first to FIG. 1, a variable ratio rack and pinion steering gear for an automotive vehicle is shown to comprise a pinion 10 and a rack 12. The pinion 10 is rotatably supported in a gear casing 14 through bearings 16 and 18. The rack 12 is in mesh with the pinion 10 and axially movable in the gear casing 14 in accordance with the rotary movement of the pinion 10. A pinion shaft 20 is provided with serrations 20a and adapted to be connected to, though not show, a steering shaft which is, in turn, connected to a steering wheel. A sealing member 22 is arranged to provide a seal between the pinion shaft 20 and the gear casing 14. The rack 12 has its opposite ends Projecting from the gear casing 14 and adapted to be connected at the opposite ends to steerable road wheels of the vehicle. A spring 24 is arranged to urge the rack 12 against the pinion 10 by way of a retainer 26, and its intensity is adjustable by advancing or retreating an adjusting nut 28. The nut 28 is locked at a set position by means of a lock nut after the adjustment of the intensity of the spring 24.

The above structure substantially follows the conventional fashion. To produce a desired variable ratio relationship the pinion 10 and the rack 12 are constructed and arranged in accordance with the present invention as will be described hereinbelow.

Figure 2:
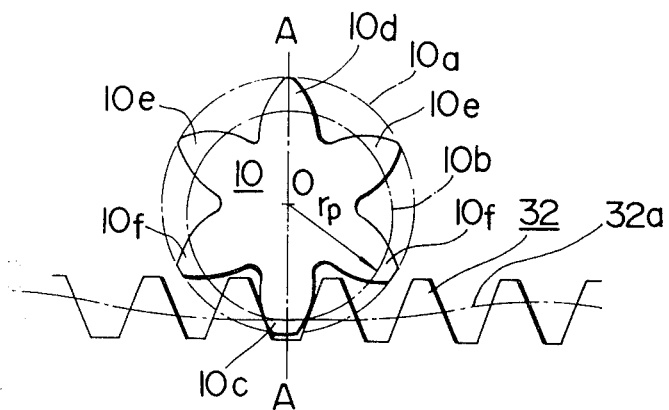
FIG. 2 shows a pinion constructed in accordance with the present invention and a uniformly toothed rack profile.

FIG. 2 shows the tooth profile of the pinion 10 constructed in accordance with the present invention. The pinion 10 is a circular gear having an addendum circle 10a concentric with the axis 0 of rotation of the pinion. The teeth of the pinion 10 are of variable shape and size and correctly meshable with a uniformly toothed rack profile 32. The rack tooth profile 32 is uniform in shape and size and preferably a standard rack tooth profile as illustrated. The pinion 10 is adapted to provide varying pitch circles and more specifically adapted to provide an effective pitch circle radius $r_p$ which is at a maximum at a central or datum position of the pinion or when the operating angle of the pinion is zero, reduces gradually with the rotary movement of the pinion in either direction out of the datum position and is at a mininum when the operating angle of the pinion out of the datum position is 180°. The datum position of the pinion 10 is aligned with the straight-ahead position of the steering wheel. The pinion 10 is therefore given an intermeshing pitch line or curve 10b which is symmetrical about the axis A—A aligned with the datum position of the pinion. More specifically, the pinion 10 is shown to comprise six teeth including diametrically opposed first and second teeth 10c and 10d. The first pinion tooth 10c is symmetrical about the axis A—A and adapted to provide a maximum pitch circle radius at the middle point thereof, whilst the second pinion tooth 10d is also symmetrical about the axis A—A and adapted to provide a minimum pitch circle radius at the middle point thereof. The remaining two pairs of teeth 10e and 10f on the respective sides of the axis A—A of symmetry are adapted to provide a gradually reducing pitch circle radius as the pinion rotates progressively in either direction out of the datum position thereof. Neither of the pinion teeth 10e or 10f has a symmetrical profile. The pinion 10 is generated by using a hob or cutter having blades of the same tooth form as the uniformly toothed rack profile 32 which is preferably a standard rack tooth profile as shown in FIG. 2.

In the variable ratio rack and pinion steering gear of the present invention, the pinion 10 constructed in the above manner is used, and the gear ratio is adapted to vary as the position of meshing engagement of the pinion 10 and the rack 12 changes with the rotary movement of the steering wheel. However, when the teeth of the rack 12 are constructed to be of uniform shape and size as, for example, of the standard rack tooth profile 32, the resulting variable ratio characteristics of the rack and pinion steering gear can be represented by the dotted line "a" in the graph of FIG. 7. That is, the resulting ratio characteristics are represented by the undulating line "a" in the graph of FIG. 7 which undulates in cycles in such a manner as to complete one cycle per one revolution of the pinion 10 in response to the rotation $\theta$ of the steering wheel.

Figure 7:
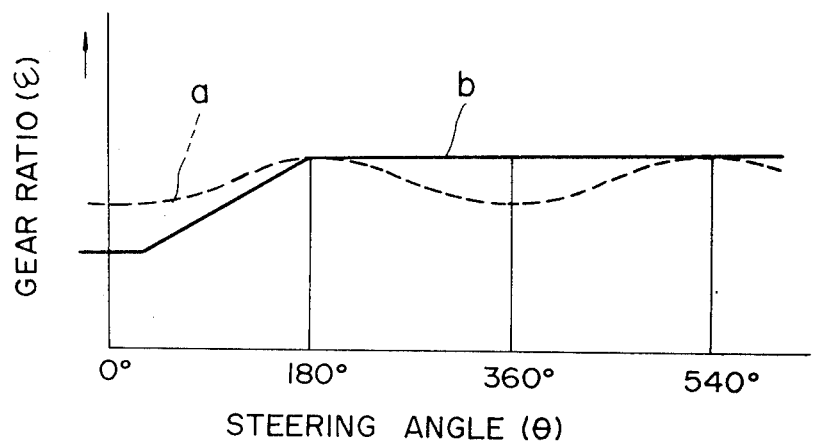
FIGS. 7 to 9 show three variable ratio characteristics of variable ratio rack and pinion steering gears constructed in accordance with the present invention.

The variable ratio characteristics of rack and pinion steering gear normally considered desirable are, however, represented by a solid line "b" in the graph of FIG. 7. That is, when the steering angle $\theta$ is smaller than 180°, a relatively small gear ratio is desired for the purpose of obtaining a high-speed stability, whereas when the steering angle $\theta$ is larger than 180°, a relatively large gear ratio is desired for the purpose of obtaining a light and smooth feel in steering operation under low-speed turning or standstill conditions.

Figure 3:
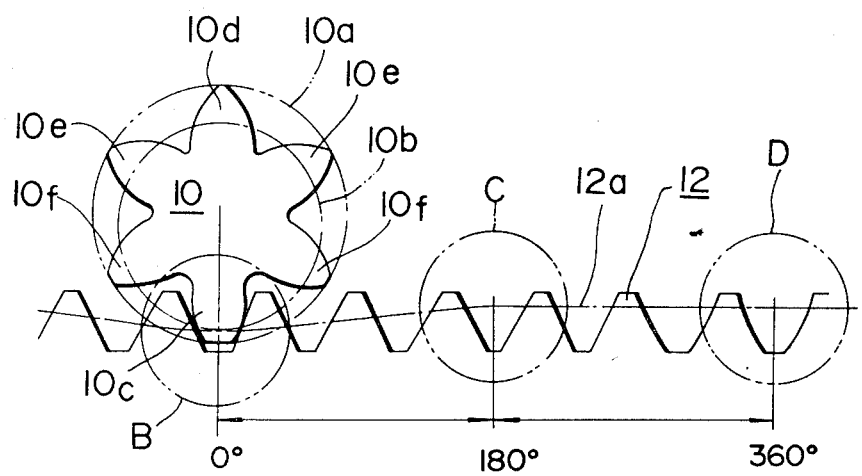
FIG. 3 shows variable ratio rack and pinion constructed in accordance with the present invention.

To achieve such desired variable ratio characteristics the rack 12 used in the rack and pinion steering gear of the present invention is constructed to have a tooth profile as shown in FIG. 3. That is, the rack 12 is generated by using the profile of the pinion 10 teeth in such a manner as to provide non-uniform relative movement between the pinion 10 and the rack 12 to provide the desired variable ratio characteristics represented by the line "b" in the graph of FIG. 7. The rack 12 produced in the above manner is given an intermeshing pitch line 12a when arranged to cooperate with the pinion 10 having the intermeshing pitch line 10b. With the rack 12 and the pinion 10 constructed in the above manner according to the present invention, the desired variable ratio characteristics represented by the line "b" in the graph of FIG. 7 can be obtained.

Figures 4A, 4B, 4C:
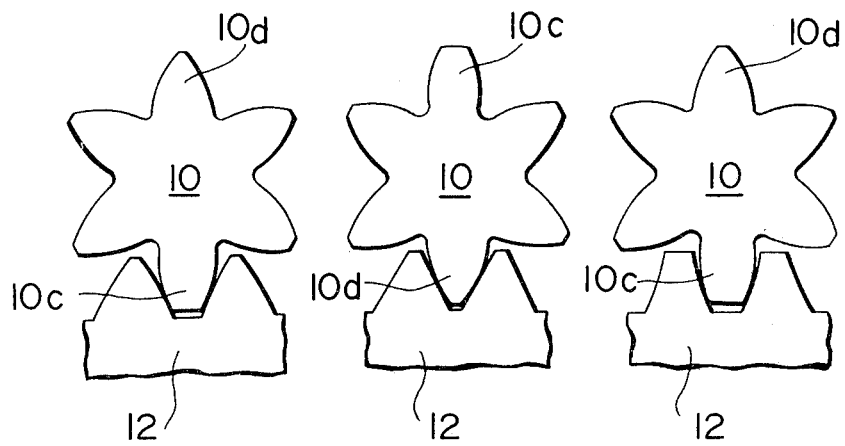
FIGS. 4(A), 4(B) and 4(C) show three operative conditions of the rack and pinion of FIG. 3 and show three rack sections corresponding to sections (B), (C) and (D) of FIG. 3, respectively.

In the rack and pinion steering gear of the present invention, the teeth of the pinion 10 constructed in the above described manner have, at the region including the pinion tooth 10c, relatively small pressure angles and also have, at the region including the pinion tooth 10d, relatively large pressure angles. Due to this, the teeth of the rack 12 generated by using the profile of the pinion 10 teeth have, at the region near the midpoint corresponding to the steering angle of zero, plus-shifted tooth profiles as shown in FIG. 4(A) and have, at the region corresponding to the steering angle of about 180°, tooth profiles similar to the standard rack tooth profile 32 as shown in FIG. 4(B) and further have, at the region corresponding to the steering angle of about 360°, minus-shifted tooth profiles as shown in FIG. 4(C). This, however, does not cause the teeth of the rack 12 to have any pointed tops at the relatively small gear ratio region or any undercuts in the roots at the relatively large gear ratio regions but allows the rack teeth to have a tooth profile similar to the standard rack tooth profile 32. With the rack 12 and the pinion 10 constructed in the above manner, a wider variation of gear ratio is possible without sacrificing the strength or rigidity of the steering gear, particularly of the rack teeth.

Figure 5:
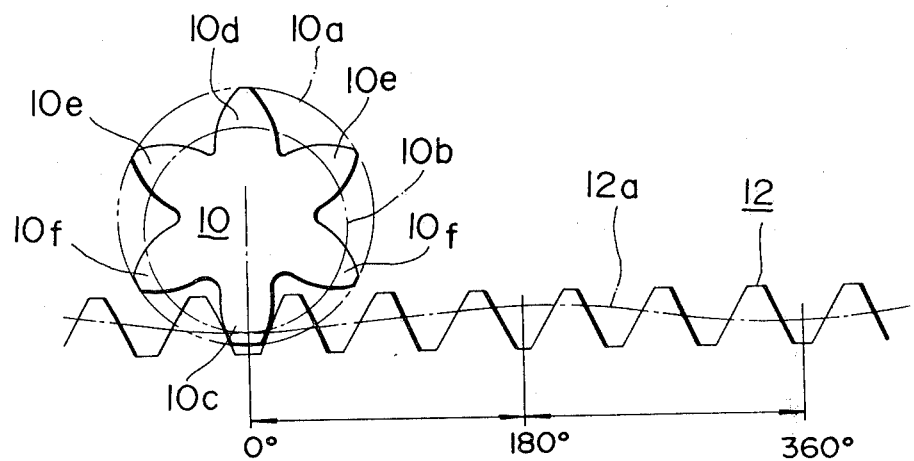
FIGS. 5 and 6 show modifications of the present invention.

FIG. 5 shows another embodiment of the present invention. In this embodiment, while the teeth of the rack 12 at the region corresponding to the steering angle of 0° to 180° are constructed in the same manner as the previous embodiment of FIG. 3, the teeth of the rack 12 at the region corresponding to the steering angle of more than 180° are constructed to have a standard rack tooth profile as the profile 32. With the above structure, the ratio characteristics represented by a solid line "c" in the graph of FIG. 8 results and wherein while the portion of the line "c" corresponding to the steering angle of more than 180° is adapted to conform to the desired characteristics line "b", the portion of the line "c" corresponding to the steering angle of more than 180° is not adapted to conform to the line "b" but to the line "a", thus slightly deviating from the desired ratio characteristics. However, since such deviation occurs at the relatively high gear ratio region and further since the amount of deviation is relatively small, no substantial problems occur in practical use and a considerable reduction in steering effort can still be obtained.

In the embodiment of FIG. 5, since the profile of the rack 12 teeth differs only at the region near the midpoint or 0° steering angle from the standard rack tooth profile 32 of FIG. 2 but has, at the remaining regions, i.e., at steering angles greater than about 180° a standard rack tooth profile, this embodiment solves the problems discussed above with respect to the prior art more completely and assuredly than the embodiment of FIG. 3. Furthermore, the rack 12 in this embodiment can be produced more easily and therefore is less expensive to manufacture.

Figure 6:
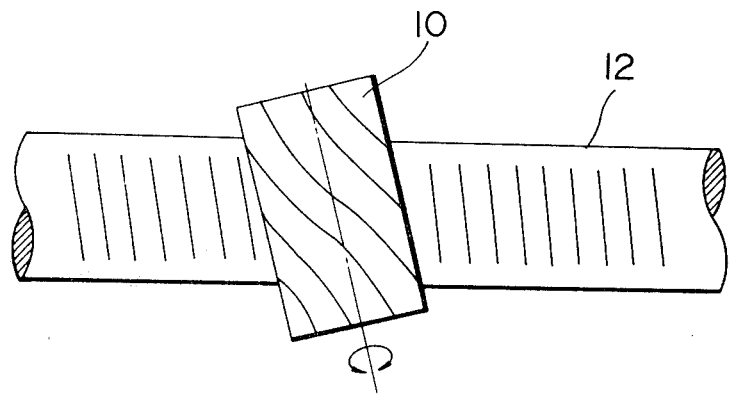

In either of the embodiments of FIGS. 3 and 5, the pinion 10 is preferably constructed to be a helical pinion as shown in FIG. 6, whilst the rack 12 is constructed to have correspondingly oblique teeth, whereby the number of teeth of the rack and pinion brought into meshing engagement at the same time is increased, thus enabling smooth meshing even when the rack and pinion are constructed to provide a considerably wide variation of gear ratios.

Figure 8:
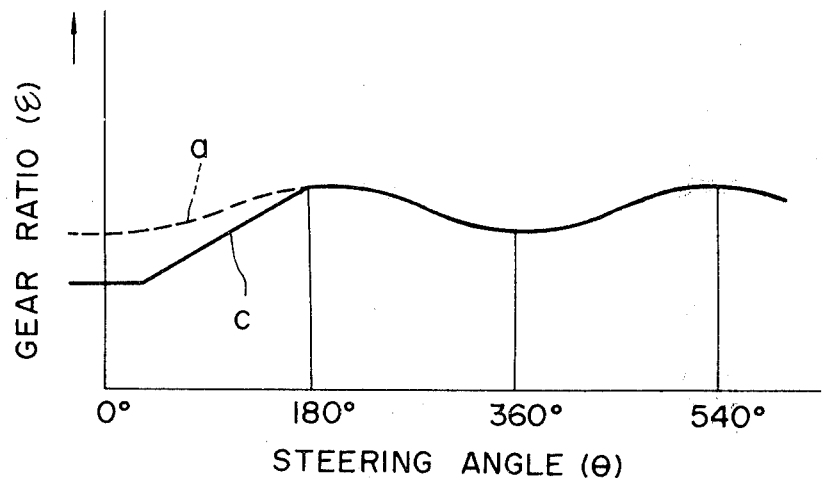

While the gear ratio characteristics of variable ratio rack and pinion steering gear have been described and shown as above, they are not limited to the characteristics represented by curves "b" and "c" of FIGS. 7 and 8 but may be arbitrarily chosen. For example, gear ratio characteristics one such one as represented by a line "d"

Figure 9:
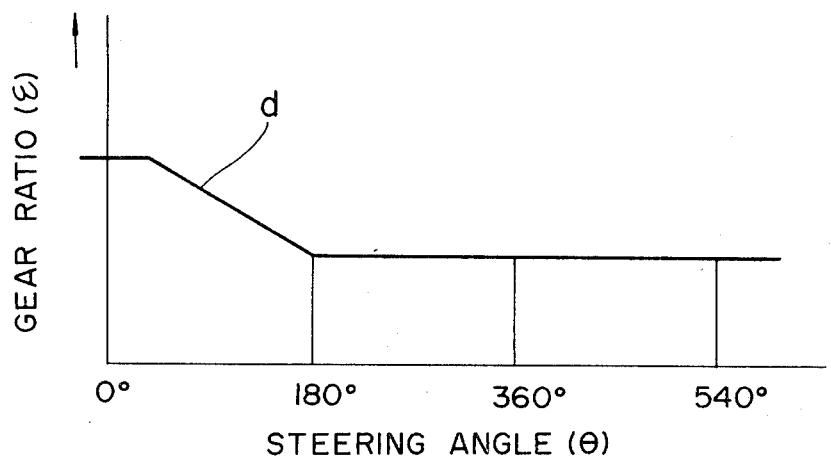

, in the graph of FIG. 9 may be used which are particularly suited for use in power-assisted steering systems and effect, in a manner completely reverse to the characteristics represented by curves "b" and "c", a relatively large gear ratio when the steering angle $\theta$ is smaller than 180° and a relatively small gear ratio when the steering angle $\theta$ is larger than 180°. In this case, the same effects as the previous embodiments of FIGS. 3 and 5 can be attained by constructing the steering mechanism so that the pitch circle radius of the pinion is at a minimum when the operating angle of the pinion is zero and at a maximum when the operating angle of the pinion is 180°.

Obviously, many variations and modifications of the present invention are possible in light of the above teachings. It is, therefore, to be understood that within the scope of the appended claims, the invention may be practiced otherwise than as specifically described.

What is claimed is:

1. A variable ratio rack and pinion steering gear comprising:

a circular driving pinion having a plurality of teeth and an axis of rotation and an addendum circle concentric with said axis of rotation, the teeth of the pinion being formed to correctly mesh with a uniformly toothed rack profile and to provide a variable pitch circle radius, said variable radius having a maximum at a predetermined position of the pinion and gradually reducing in accordance with rotary movement of the pinion in either direction from said predetermined position and having a minimum at 180° of rotary movement from said predetermined position; and a driven rack adapted to mesh with said pinion, the teeth of the rack being formed from a profile of said pinion teeth to provide a variable ratio between the pinion and the rack, said rack having a first group of teeth of variable shape and size and a second group of teeth of uniform shape and size.

2. A variable ratio rack and pinion steering gear as set forth in claim 1, wherein said pinion further has an intermeshing pitch curve, symmetrical about an axis of symmetry, said axis of symmetry being aligned with said predetermined position of the pinion.

3. A variable ratio rack and pinion steering gear as set forth in claim 1, wherein said uniformly toothed rack profile comprises a standard rack tooth profile.

4. A variable ratio rack and pinion steering gear as set forth in claim 1, wherein said first group of teeth are adapted to be meshable with said pinion when an operating angle of the pinion is between said predetermined position and 180° from said predetermined position, and said second group of teeth are adapted to be meshable with said pinion when the operating angle of said pinion is more than 180° from said predetermined position.

5. A variable ratio rack and pinion steering gear as set forth in claim 4, wherein said second group of rack teeth have a standard rack tooth profile.

6. A variable ratio rack and pinion steering gear as set forth in claim 1, wherein said pinion comprises a helical pinion.

* * * * *